Aug. 18, 1942.   J. C. WHITESELL, JR   2,293,581
SEPARABLE FASTENING ELEMENT
Filed May 10, 1941
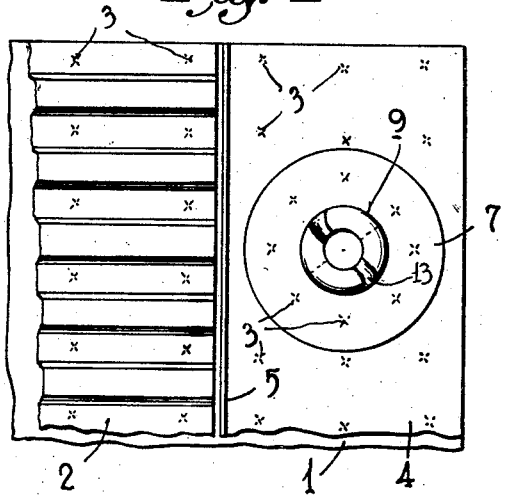
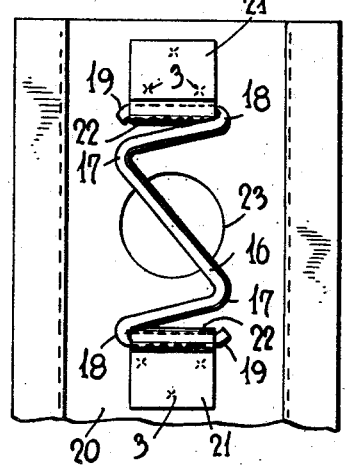
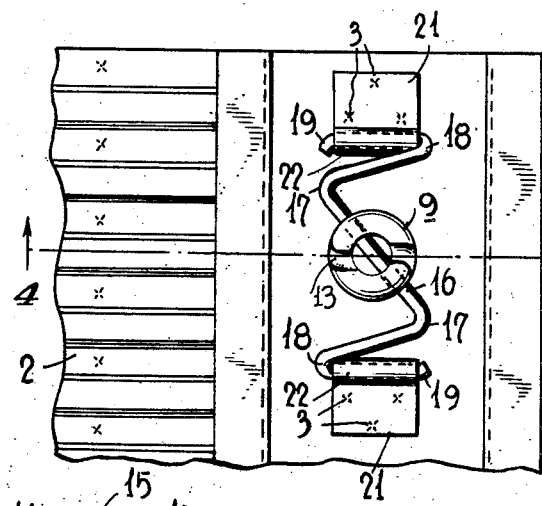
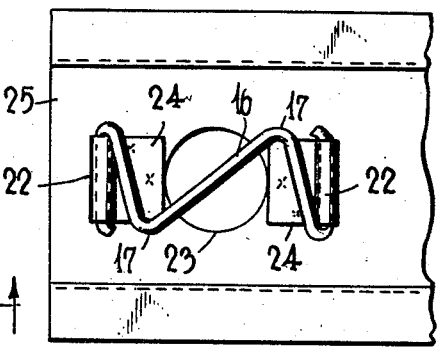
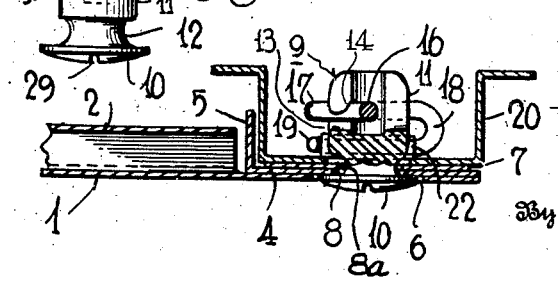
Inventor
John C. Whitesell Jr.
By John P. Tarbox
Attorney Patented Aug. 18, 1942

2,293,581

UNITED STATES PATENT OFFICE 2,293,581

SEPARABLE FASTENING ELEMENT

John C. Whitesell, Jr., Norristown, Pa., assignor to Edward G. Budd Manufacturing Company, Philadelphia, Pa., a corporation of Pennsylvania Application May 10, 1941, Serial No. 392,852

2 Claims. (Cl. 24—221)

The present invention relates to releasable fasteners for securing together two members in situations where there is great vibration. Ordinary releasable fasteners would tend to become disengaged upon being subjected to excessive vibration, and therefore relatively complicated devices were heretofore employed to prevent such accidental or undesired release. The problem is particularly serious in connection with airplanes, wherein of course vibration is always present due not only to the motor, but to air currents impinging upon the structure of the airplane itself.

It has already been proposed to provide a fastener of this type consisting of a piece of wire coiled at both ends to provide a resilient support for a central straight portion of the wire, the said ends of the wire being secured to one part of the structure by screws or rivets passing through the centers of the coils, the other part of the structure having a cam-like member mounted for rotation therein, with the cam adapted to engage the central straight portion of the wire when the whole is turned in one direction and to release it when turned oppositely.

However, additional complications result from the necessity of employing rivets or the like for securing the wire member to the airplane, and an object of the present invention is to simplify the whole by making it possible to utilize spot welding or the like for securing the fastener element to the airplane. This has particular advantages in many cases where it is difficult or impossible to reach the inner surface of the airplane part to which the wire is to be secured, since it is necessary in riveting not only to provide alined holes and insert the rivet therethrough, but also to provide some temporary support or anvil for the projecting end of the rivet, to make it possible to form a suitable burr or head thereon.

In one form of the present invention, access to the parts to be joined is given through a single hole, through which suitable welding electrodes may be inserted, to take part in the spot welding operation. In this form each end portion of the wire has a flap or tab of metal, such as stainless steel, extending inwardly therefrom so that these flaps, which are to be secured on opposite sides of the said hole, may be reached easily with the inner electrodes.

However it is not always necessary that these tabs extend inwardly, and in certain cases it may be preferable to have them extend outwardly instead, while in still other cases of course one of them might extend inwardly and the other outwardly, as determined by the space available and other characteristics of the work-piece.

Preferably a slight degree of resilient yield is provided beyond the ends of the central straight portion of the wire, which may be accomplished readily by providing a further portion of wire extending at an angle to the central portion and then bent down and back parallel to itself, to form supports for the above-mentioned flaps.

In this way the central portion of the wire acts like a rather stiff spring which is free to move axially of the cam member, in order to yield sufficiently to ride up the cam grooves and then lock firmly in the small offset at the inner end of each groove, thus providing a lock which can be disengaged only by intentionally doing so, and which cannot open spontaneously due to vibration or other accidental causes.

The cam element of the securing device preferably has a head at one end, which may be slotted like an ordinary screw or the like to receive a screw-driver. This cam is preferably provided with a washer engaged rotatably thereon, and adapted to be secured to the other portion of the airplane to constitute a mounting means for the cam element.

The cam may have a slight reduction or groove therein just below its head, and the washer may have its central hole punched in such a way as to produce a burr or projection through which the cam member may then be introduced forcibly, whereupon, if necessary the burr may be pushed back or partly back into the plane of the washer, thus keeping the cam from dropping out and becoming lost, without in any way preventing its freedom of rotation. This washer preferably will be secured to the airplane structure by welding, thus combining cheapness of manufacturing with neatness of appearance, lack of projecting rivet heads or the like, and very secure and rigid permanent connection.

To facilitate understanding the invention, a specific embodiment thereof, together with a modified form of the same are described in the present specification and illustrated in the accompanying drawing, wherein:

Fig. 1 is a rear elevation of a fragment of the structure of an airplane or the like, showing one of two separable parts that are held together by a fastener embodying the invention;

Fig. 2 is a rear elevation of a fragment of the companion member, carrying the other element of the fastener;

Fig. 3 shows the two separable elements engaged with one another and secured by the fastener;

Fig. 4 is a section through the structure illustrated in Fig. 3, the section being made on the plane indicated by the line 4—4 of Fig. 3;

Fig. 5 is an elevation of a cam member forming part of the fastener;

Fig. 6 is an elevation corresponding to Fig. 2 but showing a slightly modified form of one of the elements of the fastener; and Fig. 7 illustrates the process of welding employed in connection with such modified form of fastener.

In all the figures, corresponding elements are indicated by similar reference characters.

Referring to Figs. 1 and 4 the reference character 1 designates a flat piece of metal such as a sheet of stainless steel, reinforced by a corrugated piece of stainless steel 2 welded thereto in any preferred way, as by the spot welds 3. The end portion of the sheet 1 may have a finish strip 4 secured thereto by spot welding as illustrated, and may be strengthened by an upturned flange 5 adjacent the ends of the corrugations of the sheet 2. A hole 6 is provided in the sheets 1 and 4, and back of this opening a stainless steel washer 7 is secured, preferably by spot welding it to the other two sheets, this washer having an opening 8 therein of smaller diameter than the hole 6.

A cam member 9 cooperates with these holes, as best shown in Fig. 4. It comprises a slotted head 10 adapted to receive a screw driver or similar tool for turning it, there being a neck or restriction 12 just below the head, while beyond said neck the cam member again increases in diameter to a size somewhat smaller than the diameter of the head 10, forming a substantially cylindrical portion 11.

This portion 11 is of such diameter that it may be forced through the hole 8 of the washer 7, but will not fall through it of its own accord. In order to make sure that the cam member 9 will be retained in engagement with the washer 7, the said washer 7 may have the hole 8 punched therein in such way as to leave a burr 8a, whereupon the portion 11 of the cam member 9 may be forced through said hole and thereupon the burr may be forced back into approximately the plane of the washer, thus constricting the hole sufficiently to make sure that the washer will not slip off the cam spontaneously.

The cam member itself, shown in Figs. 4 and 5, has preferably a slot 13 therein extending diametrically across the same and having a recurved end portion 14, at a slightly greater distance from the head 10 than an intermediate portion 15 of the groove. This end portion 14 of the cam groove 13 cooperates with the other element of the fastener as show in Fig. 4, to hook over the portion 16 thereof when in the locked position and to release the same when the cam is turned by means of a screw driver or the like.

This is made clearer in Fig. 2, wherein the element 16 is seen to be a wire or rod bent symmetrically at both ends at 17, 18, and 19 respectively. The purpose of the bends at 17 is to provide a greater unsupported length of wire 16 between the bends at 18 which adjoin the means for fastening the element 16 to the stainless steel sheet 20 forming part of the companion member of the separable joint. These means are here shown as straps 21 of stainless steel secured to the member 20 by spot welds 3 and having end portions 22 encircling or substantially encircling the ends of the element 16.

Inasmuch as these portions 22 of the straps 21 do not bear any great strain in service, since the force exerted on the element 16 always tends to pull it toward the plate 20, it is not necessary that the bent-over ends 22 of the straps 21 be very strongly made. The bends at 19 serve solely the purpose of preventing the straps 21 from becoming disengaged from the wire 16.

Reference to Figs. 2 and 4 jointly shows that the upper portion of the wire 16 is spaced a considerable distance above the lower portion, to which it is connected by the bend 18. This feature, in connection with the relatively long distance between bends 17 and 18, provides a considerable degree of resiliency in the member 16, that is, its upper portion may yield vertically in the position shown in Fig. 4, so that by engaging the cam slots over said wire and then turning the cam, the wire will be drawn down into the slots until finally it passes the portion 15 and again springs up into the ends 14, where it will be held firmly, but resiliently.

In Fig. 2 it is assumed that the straps 21 are accessible from both sides for welding, and hence they are here shown as projecting in opposite directions and away from the element 16, since in this way they are most readily reached by the electrodes. The hole 23 in the plate 20 affords means of entrance for the cylindrical portion 11 of the cam 9 in the vicinity of the wire 16. Fig. 3 indicates the two parts illustrated in Figs. 1 and 2 when interlocking with one another.

In some cases one of the elements to be secured by the fastener has its rear surface inaccessible for welding the straps 21 thereto, and in such cases use if made of the slightly modified construction illustrated in Fig. 6 and 7. Here the straps 21 of Fig. 2 are replaced by straps 24 which are oppositely directed, that is they extend inwardly from the ends of the wire 16. They are then preferably made of such length that they will extend approximately to the opening 23 as shown.

The purpose of this change will be understood from Fig. 7, wherein there is illustrated diagrammatically the process of spot welding the straps 24 to the member 25. The welding electrode 26 is here of the ordinary type, while the electrode 27 is modified by having its active end 28 bent or offset as shown, so that it may be entered through the hole 23 and brought opposite the end of the companion electrode 26 for the purpose of spot welding the strap 24 to the member 25 as illustrated diagrammatically.

It will be noted that in this way there is no obstruction preventing easy welding, as would be the case if the straps were turned in the other direction as in Fig. 2, wherein the wire 16 would itself be likely to get in the way, aside from requiring a longer offset tip on the electrode 27. This is a very desirable construction where changes are made after the original structure has been completed, since it permits making new openings and doors even where the inside of the relatively stationary member of the separable joint is entirely inaccessible from the exterior. All that is necessary is to make the hole 23, that is large enough to admit the wire 16 with its attached straps 24, which may then be positioned as desired and welded by means of an offset electrode introduced through the same hole.

The operation of the fasteners hereinabove described will be readily understood from the structures of the same. In making the form disclosed in Figs. 1 and 3, the washer 7 is secured to the plate 4 to hold the cam member 9 rotatably in proper position, while the tabs 21 are welded to the other member 20 to hold the bent rod 16 in proper position adjacent the hole 23 so that when the member 9 is inserted through said hole the central portion of the rod 16 will enter the slot of the cam member 9 which may then be turned by means of any suitable tool, such as a screw driver, engaged in the slot 29 of the head 10.

Upon turning the cam member in one direction, the slot or groove therein will then ride up on the central portion of the rod 16, which of course will yield resiliently, until the same has passed the hump at 15, whereupon it will snap into the end portion 14 of the slot. Since as stated the rod 16 is resilient, it will automatically remain in this portion 14 of the slot and will prevent the cam member 9 from turning spontaneously, due to vibration or the like. Thus the rod and cam cooperate to hold one another firmly in engagement so that they can be released only by intentionally turning the cam member in the disengaging direction.

The operation of the slightly modified form disclosed in Figs. 6 and 7 is of course identical with that of the previously described form, since the only difference in these forms resides in their construction, and not in their operation. The form of Figs. 6 and 7 is as stated particularly advantageous for use where there is no room for outwardly extending tabs, such as those shown at 21 in Fig. 2, or where even if there were room it would be impossible to weld such tabs without prohibitive difficulty.

While the invention has been described in connection with a specific embodiment thereof and a slightly modified form, it should be clearly understood that this disclosure is merely illustrative and in no sense restrictive. An important feature of the invention resides in providing a simple and efficacious means for interlocking two elements which must be readily separable from one another, but which on the other hand should not separate spontaneously as a result of vibration or the like.

This is accomplished by providing a resiliently mounted or resilient member, adjacent an opening in one of the elements through which a locking means mounted in the other element may pass, the present invention being concerned particularly with the means and manner of securing the resiliently mounted or resilient member to one of the elements, the way at present preferred being to provide metal tabs at the ends of such member for spot welding to the element.

It is clear that many modifications may be made in the actual dimensions, positions, and materials employed without departing from the spirit of the invention, which is defined solely by the following claims.

I claim:

1. In a fastening device embodying a rotatable element having a bayonet locking slot therein and being adapted to be rotatably secured in one of a pair of parts to be secured together, the other part of which is of spot-weldable metal and has an aperture therethrough for loosely receiving the rotatable element, a resilient rod-like member having a central portion adapted to be disposed across the aperture in said other part, said central portion having substantially parallel end portions extend therefrom in opposite directions, and metallic clips having portions surrounding said end portions and integral flat portions disposable against said other part adjacent diametrically opposite sides of the aperture therein and adapted to be spot-welded to said other part through the medium of welding electrodes, one of which is insertable through said aperture.

2. In a fastening device embodying a rotatable element having a bayonet locking slot therein and being adapted to be rotatably secured in one of a pair of parts to be secured together, the other part of which is of spot-weldable metal and has an aperture therethrough for loosely receiving the rotatable element, resilient rod-like member having a central portion adapted to be disposed across the aperture in said other part, said central portion having substantially parallel end portions extend therefrom in opposite directions, and metallic clips having portions surrounding said end portions and integral flat portions, said flat portions being adapted to extend from said end portions toward each other at diametrically opposite sides of the aperture of said other part and adapted to be spot welded to said other part through the medium of spot-welding electrodes, one of which is insertable through the said aperture.

JOHN C. WHITESELL, Jr.